United States Patent [19]

Nishida et al.

[11] Patent Number: 4,647,722
[45] Date of Patent: Mar. 3, 1987

[54] LAND MOBILE TELEPHONE SYSTEM

[75] Inventors: Kouji Nishida; Chikahisa Hayashi, both of Anjo; Makoto Kanai, Kani, all of Japan

[73] Assignees: Aisin Seiki Kabushiki Kaisha, Kariya; Toyoda Gosei Co., Ltd., Nishikasugai, both of Japan

[21] Appl. No.: 780,848

[22] Filed: Sep. 27, 1985

[30] Foreign Application Priority Data

Sep. 28, 1984 [JP] Japan .................................. 59-204990

[51] Int. Cl.$^4$ ............................................. H04M 1/23
[52] U.S. Cl. ........................................ 379/63; 455/88; 455/89; 379/388
[58] Field of Search ................. 179/2 E, 2 EA, 2 EB, 179/2 EC; 455/88, 89

[56] References Cited

U.S. PATENT DOCUMENTS 4,307,266  12/1981  Messina ............................ 179/2 DP
4,455,454  6/1984  Umebayashi ........................ 179/2 E

OTHER PUBLICATIONS

K. Kobayashi et al, "Detachable Mobile Radio Units for the 800 Hz Land Mobile Radio System" IEEE Vehicular Technology Conference, May 1984, pp. 6–11.

Primary Examiner—Robert G. Lev
Attorney, Agent, or Firm—Oblon, Fisher, Spivak, McClelland & Maier

[57] ABSTRACT

The present invention relates to a land mobile telephone system with enhanced operability realizing both the loud-speech and closed-speech operations by the single handset. The handset is installed detachably in a pad of a steering wheel of an automobile and having a power terminal for feeding electric power from an automobile-equipped battery to said handset devices when said handset is seated in the steering wheel pad, said controller having a speed mode selector which selects a loud-speech mode when said handset is seated in the steering wheel pad or selects a closed-speech mode when said handset is taken out of the steering wheel pad.

5 Claims, 17 Drawing Figures

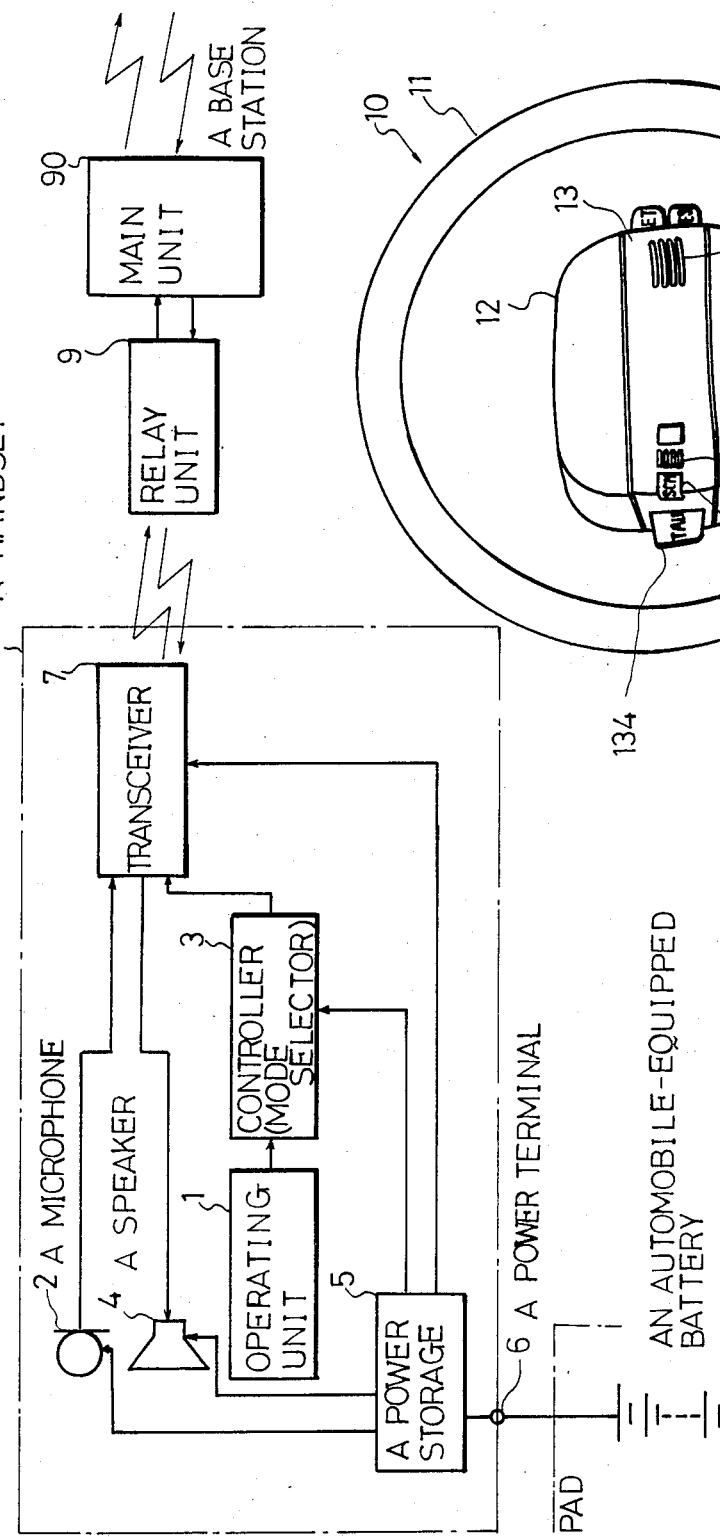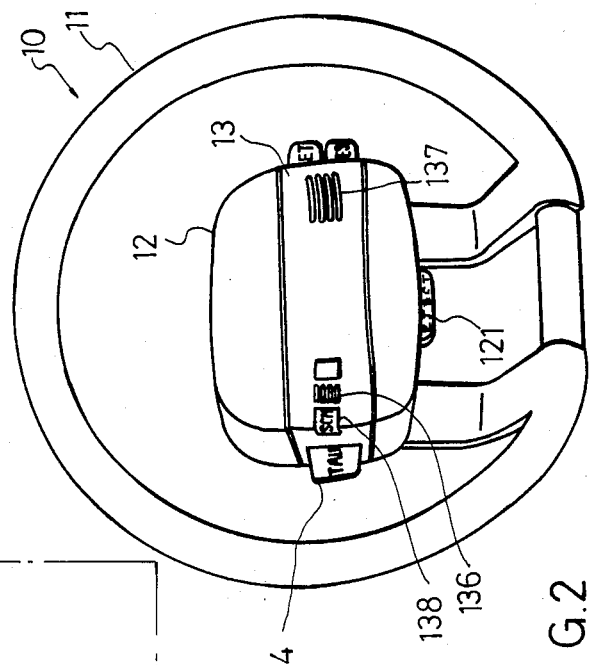
FIG.1
FIG.2

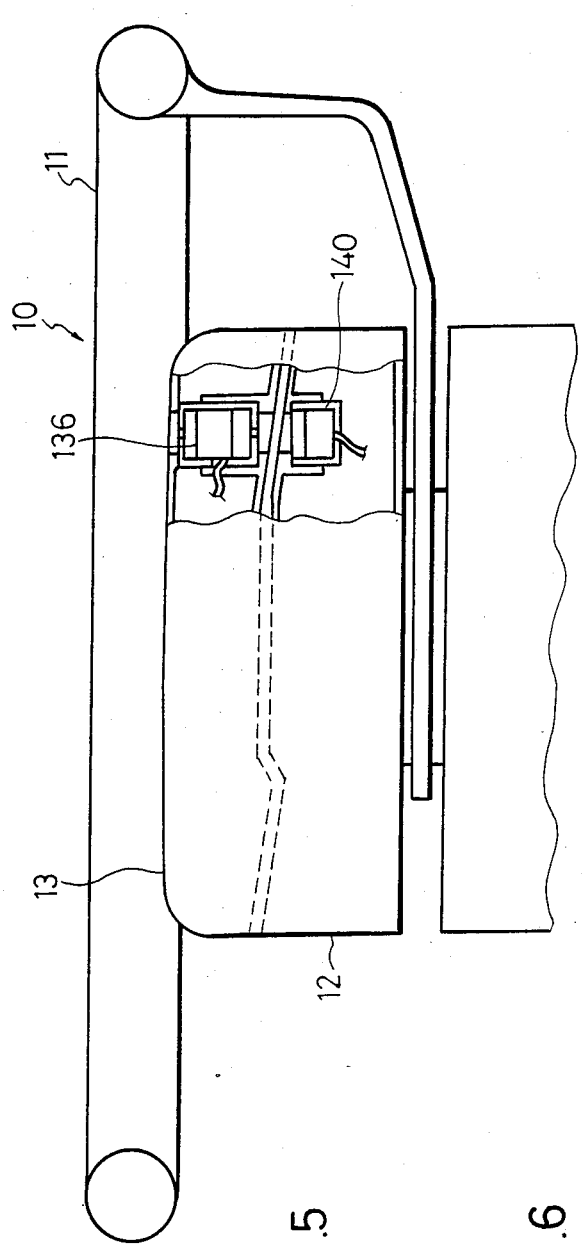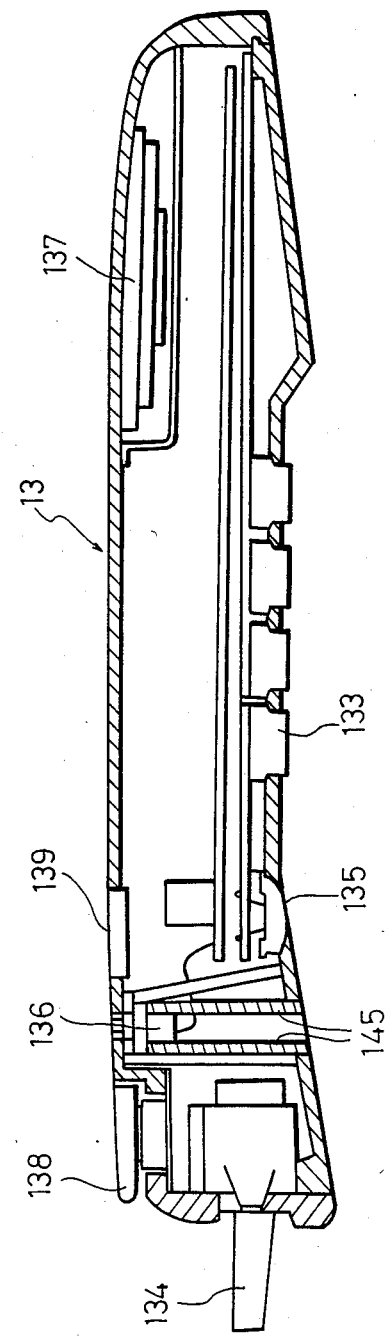
FIG.5
FIG.6

LAND MOBILE TELEPHONE SYSTEM

BACKGROUND OF THE INVENTION

1. Field of the Invention

The present invention relates to a land mobile telephone system with enhanced operability to provide easy use for the driver and co-passengers in the rear seat of the automobile during a run.

2. Brief Description of the Prior Art

With the recent advancement of mobile communications networks, there arise increasing demands of installing the telephone equipment in automobiles. However, the conventional telephone equipment for use in an automobile is the same type as those used commonly indoors, and it is not intend to match the specialty of usage for the automobile user. Such an automobile owner needs a telephone call as well as reception during the driving maneuver. However, the telephone set of the same type as used indoors is too complex in operation when intended to do during a run. The telephone set for this purpose must be easily operable also for a passenger in the rear seat of the automobile. The conventional land mobile telephone equipment is not suitably designed to provide versatile functions and easy use for the driver and co-passengers.

SUMMARY OF THE INVENTION

It is an object of this invention to solve the foregoing problems and provide a novel land mobile telephone equipment with enhanced operability. This invention realizes both the loud-speech and closed-speech operations by the single handset. This allows the vehicle driver to have a loud-speech telephone call by easily operating the switch on the handset held in the steering wheel pad during a drive, while allowing a passenger in the rear seat to have a closed-speech telephone call in exactly the same manner as of the usual telephone set with enhanced easiness of operation since the handset is linked by radio with the remaining portion of the equipment in the steering wheel pad.

BRIEF DESCRIPTION OF THE DRAWINGS

The exact nature of this invention, as well as other objects and advantages thereof, will be readily apparent from the consideration of the following specification relating to the annexed drawings in which:

FIG. 1 is a block diagram showing the concept of this invention;

FIG. 2 is an external view of the telephone equipment embodying this invention;

FIGS. 5 and 6 are cross-sectional views of the pad and handset showing the disposition of the microphones;

DETAILED DESCRIPTION OF THE INVENTION

Figure 3:
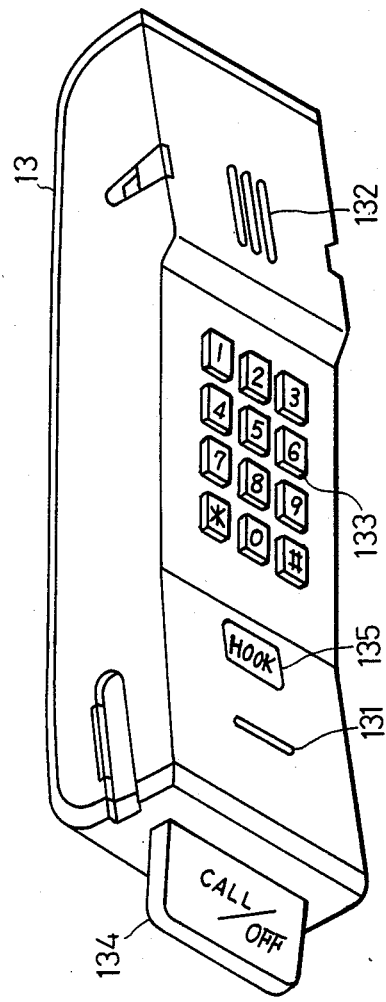
FIGS. 3 and 4 are perspective views showing the structure of the handset.

FIG. 1 is a block diagram showing the concept of this invention. The invention equipment consists of a handset 13 including a microphone 2, a speaker 4, an operating unit 1 for selecting a called party and establishing the communication, a transceiver 7 operating to transact the audio signal and control signal by radio with the relay unit 9 (will be introduced shortly), a controller 3 which receives the signal from the operating unit 1 and issues the control signal depending on the operating state to the relay unit 9 through the transceiver 7, and a power storage (cell) unit 5 for supplying electric power to the above devices; and a relay unit 9 for transmitting and receiving the audio signal and control signal with the transceiver 7, the relay unit 9 being connected with a mobile telephone equipment main unit 90 which implements radio telephone transmission and reception with a base station. The handset 13 is mounted detachably in the steering wheel pad of the automobile, and adapted to receive power on its power terminal 6 from the automobile-installed battery when the handset is held in the steering wheel pad. The controller 3 operates on its mode switching device to select the loud-speech mode when the handset is held in the pad, or select the closed-speech mode when the handset is taken out of the pad.

The inventive telephone equipment features that its handset is accomodated within the pad of the steering wheel of the automobile. The handset 13 incorporates a microphone 2, speaker 4, and operating unit 1 for establishing the communication with a selected called party. The operating unit 1 is made up of a dial, push button dial, operating switch for producing the on-hook signal and off-hook signal, and abbreviated telephone number input panel allowing easy selection of a called party.

The handset 13 further incorporates a transceiver 7, through which the control signal and audio signal are transacted by radio with the relay unit 9 connected to the mobile telephone equipment main unit, and further incorporates a controller 3 for controlling the signal transmission and reception. The handset 13 is supplied with power from the battery through the power terminal provided in the pad when it is held in the pad. The handset 13 has a power storage 5, from which power is supplied to the internal devices when it is taken out of the pad.

The controller 3 is capable of detecting as to whether the handset 13 is held in the pad, and it operates on its mode selector to select the loud-speech mode when the handset 13 is held in the pad, or select the closed-speech mode when the handset 13 is taken out of the pad, allowing the driver to make communication in loud-speech mode without holding the handset 13 by hand and also allowing a passenger in the rear seat to access to the handset for making communication in closed-speech mode.

DETAILED DESCRIPTION OF THE PREFERRED EMBODIMENTS

A particular embodiment of the this invention will now be described in detail.

Figure 4:
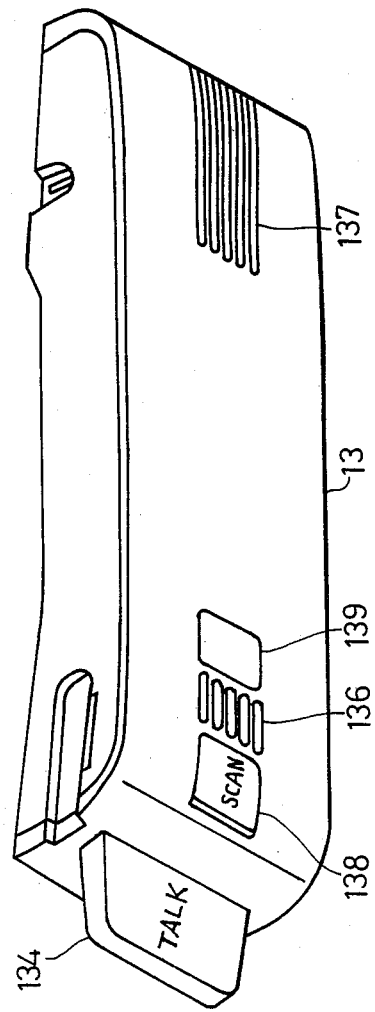

FIG. 2 is a perspective view of the telephone handset according to this invention designed to fit in the pad of the steering wheel of the automobile. A steering wheel 10 is made up of a ring handle 11 and a pad 12. A handset 13 is mounted detachably in the pad 12, and it is taken out of the pad 12 by operating an ejection button 121. FIGS. 3 and 4 are perspective views showing respectively the back and front to the handset 13. The handset 13 incorporates on its back side a microphone 131, a closed-listening speaker 132, a calling push button 133, a talk switch 134 for controlling the speech, and a hook switch 135. The handset 13 also incorporates on its front side a voice inlet 136 communicating with the microphone 131 thereby to allow talking in loud-speech mode, a speaker 137 used in loud-speech mode, a switch 138 for scanning called party's numbers which have been stored in advance, and an indicator 139 for displaying an abbreviated number of a called party.

FIG. 5 is a partical cross-sectional view showing the handset 13 seated in the steering wheel pad 12. FIG. 6 is a cross-sectional view showing the internal arrangement of the handset 13. The second microphone 140 is disposed within the pad 12 concentrically with the first microphone 136, so that a gradient microphone is formed. Both microphones 136 and 140 are capacitor microphones incorporating FETs. The first microphone 136 is covered with a cylindrical isolating member 145 for the protection against the sound output of the speaker 137 as shown in FIG. 6.

The inventive telephone equipment allows the automobile driver to make a telephone call in loudspeech mode, with the handset being held in the pad, by specifying a called party through the scanning of the stored telephone number table using the station call switch 138. The equipment also allows the normal usage in closed-speech mode when the handset is taken out of the pad, by dialing a telephone number on the push button set 133 (10 keys) or by use of the station call switch 138.

Figure 7:
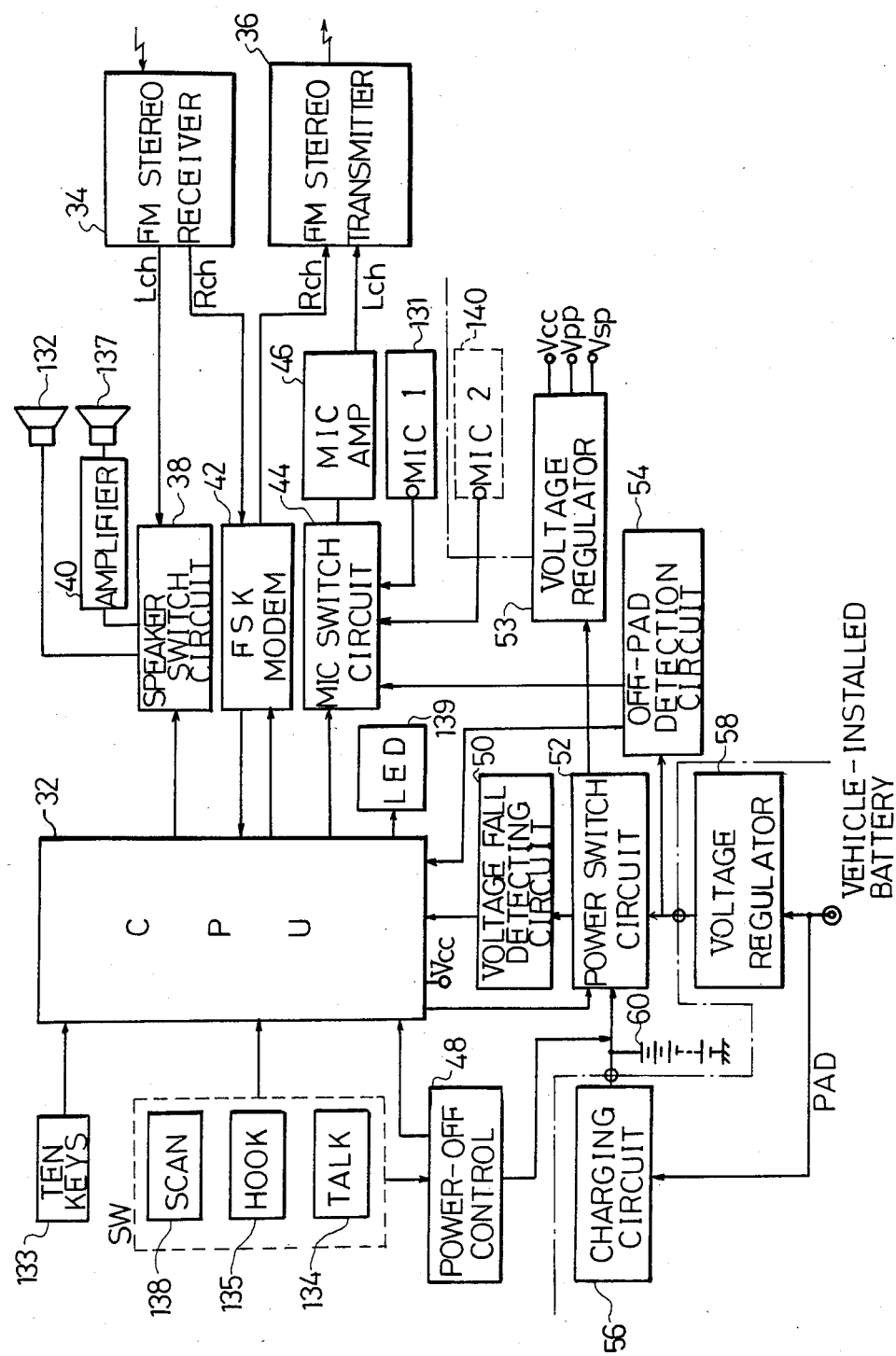
FIGS. 7 and 8 are block diagrams showing the circuit arrangement of the equipment.
Figure 8:
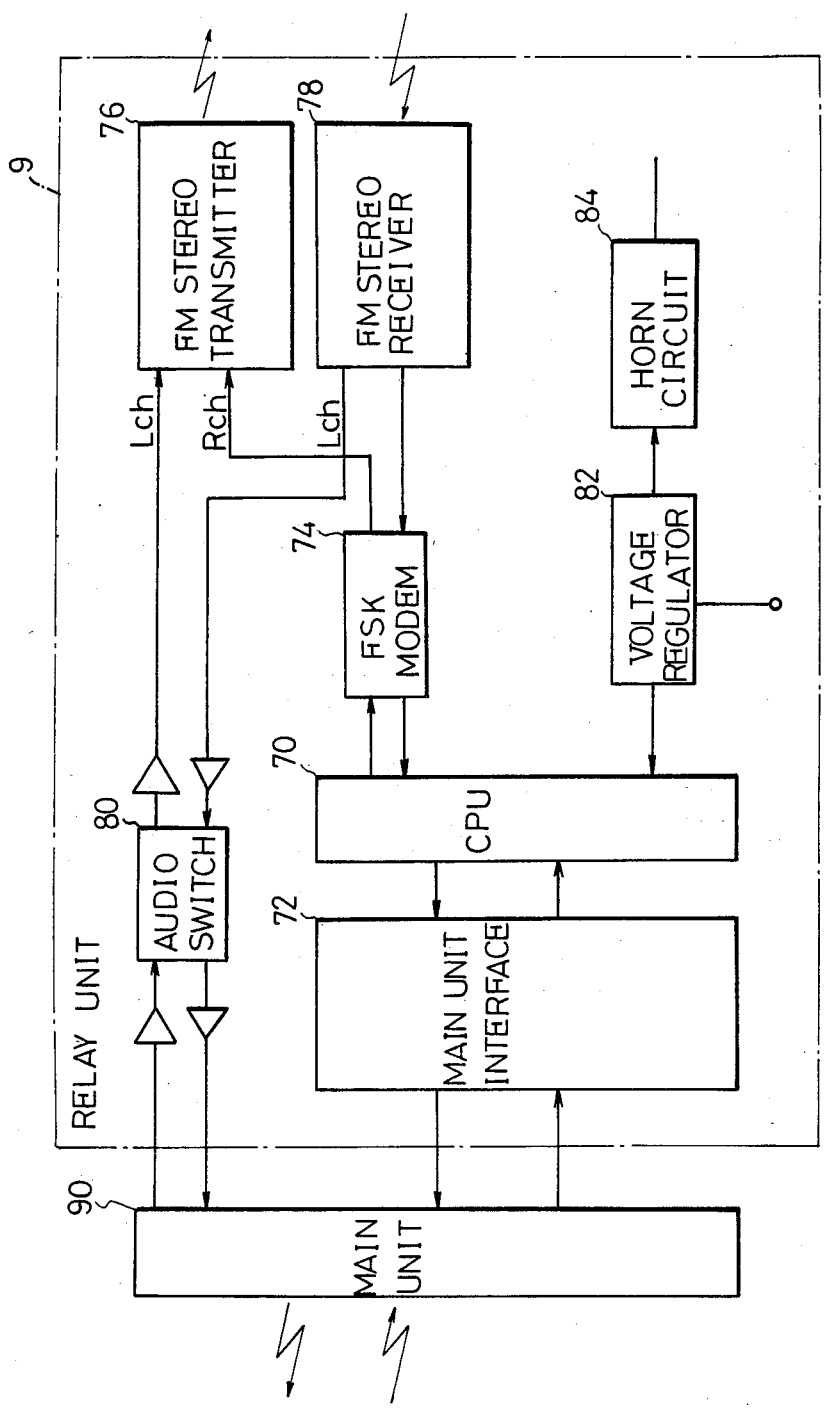

FIG. 7 shows in block diagram the circuit arrangement provided in the pad 12 and handset 13, and FIG. 8 shows the circuit arrangement of the relay unit installed on the user's automobile. Control within the handset 13 is implemented by a CPU 32, which is in connection with a push button key set 133, station call switch 138, hook switch 135 and talk switch 134. The control signals produced by these operating switches are processed by the CPU 32, and after being frequency-modulated by a modem 42, delivered to an FM stereo transmitter 36.

In closed-speech mode, a microphone switch circuit 44 selects the audio signal from the microphone 131 and delivers it through an amplifier 46 to the FM stereo transmitter 36. The control signals are treated dividedly in the right channel and left channel, and the FM radio wave transmitted by the transmitter 36 is received by an FM stereo receiver 78 in the relay unit.

The FM radio wave transmitted by an FM stereo transmitter 76 in the relay unit is received by an FM stereo receiver 34, and the audio signal is delivered through a speaker switch circuit 38 to the speaker 132 in closed-speech mode, or to the speaker 137 via an amplifier 40 in loud-speech mode.

The circuitry within the handset 13 is powered by the vehicle-installed battery through a voltage regulator 58 provided in the pad 12 when the handset is held in the pad. The battery is also used to charge a rechargeable cell 60 in the handset 13 through a charging circuit 56 provided in the pad 12. When the handset 13 is taken out of the pad 12, an off-pad detection circuit 54 operates on a power switch circuit 52 through the CPU 32, and the handset 13 is powered by the rechargeable cell 60. The voltages supplied by these power sources are converted into several voltages by a voltage regulator 53.

The relay unit 9 incorporates a main unit interface 72 in connection to the main unit 90, a CPU 70, an FM stereo transmitter 76, an FM stereo receiver 78, a modem 74 and a audio switch 80. Among the FM radio wave received by the FM stereo receiver 78, the audio signal is delivered through the audio switch 80 to the audio signal input terminal of the main unit 90, while the control signal encoded by the modem 74 is fed to the CPU 70 and after being processed delivered through the main unit interface 72 to the control input signal terminal of the main unit 90.

When the off-pad detection circuit 54 in the handset 13 detects that the handset is held in the pad 12, the CPU 32 selects the speaker 137 and activates both of the microphone 131 and the microphone 140 installed in the pad so as to form a gradient microphone for the speech operation in loud-speech mode.

In this state, when the system receives an incoming call, a ring is sounded by the speaker 137. Then, the user talks in loud-speech mode by operating the talk switch 134. On the completion of communication, the talk switch 134 is operated again so that the system is removed from the telephone network. In more detail, the CPU 32 had memorized the state of the talk switch 134, and sends the off-hook signal or on-hook signal depending on the switch position to the CPU 70 in the relay unit, then the CPU 70 sends the off-hook signal or on-hook signal to the main unit 90, which in turn transmits the activation signal or termination signal to the base station to connect or release the telephone network.

To make a call, the user operates the station call switch 138 to read out the preset abbreviated telephone numbers on the indicator 139. Upon selection of a called party's number, the CPU 32 sends the telephone number corresponding to the abbreviated number to the main unit 90 via the CPU 70 in response to the operation of the talk switch 134. The main unit 90 transmits the telephone number to the base station, which then rings the called party through the exchange and network and, at the same time, issues a ring signal to the mobile main unit 90 with the result of a ring emitted by the speaker 137. When the called party responds to the ring, the connection is established between both parties through the network. In response to the operation of the talk switch 134 upon termination of communication, the CPU 32 issues the on-hook signal and the main unit 90 transmits the termination signal to shut down the line connection. As will be appreciated, the talk switch 134 functions identically to the hook switch equipped in the usual telephone set.

Next, the operation in closed-speech mode will be described. When the handset 13 is taken out of the pad, the off-pad detection circuit 54 issues the signal to the CPU 32, which then selects the microphone 131 and speaker 132. The ring signal is sounded by the speaker 137. The same operating procedures are used to respond to an incoming call and to make calling. In this mode, a call can be made also by dialing a formal telephone nubmer of a called party by use of the hook switch 135 and push button key set 133. To terminate a call, the user operates the talk switch 134, and the on-hook signal is produced so that the main unit 90 transmits the termination signal.

Figure 9:
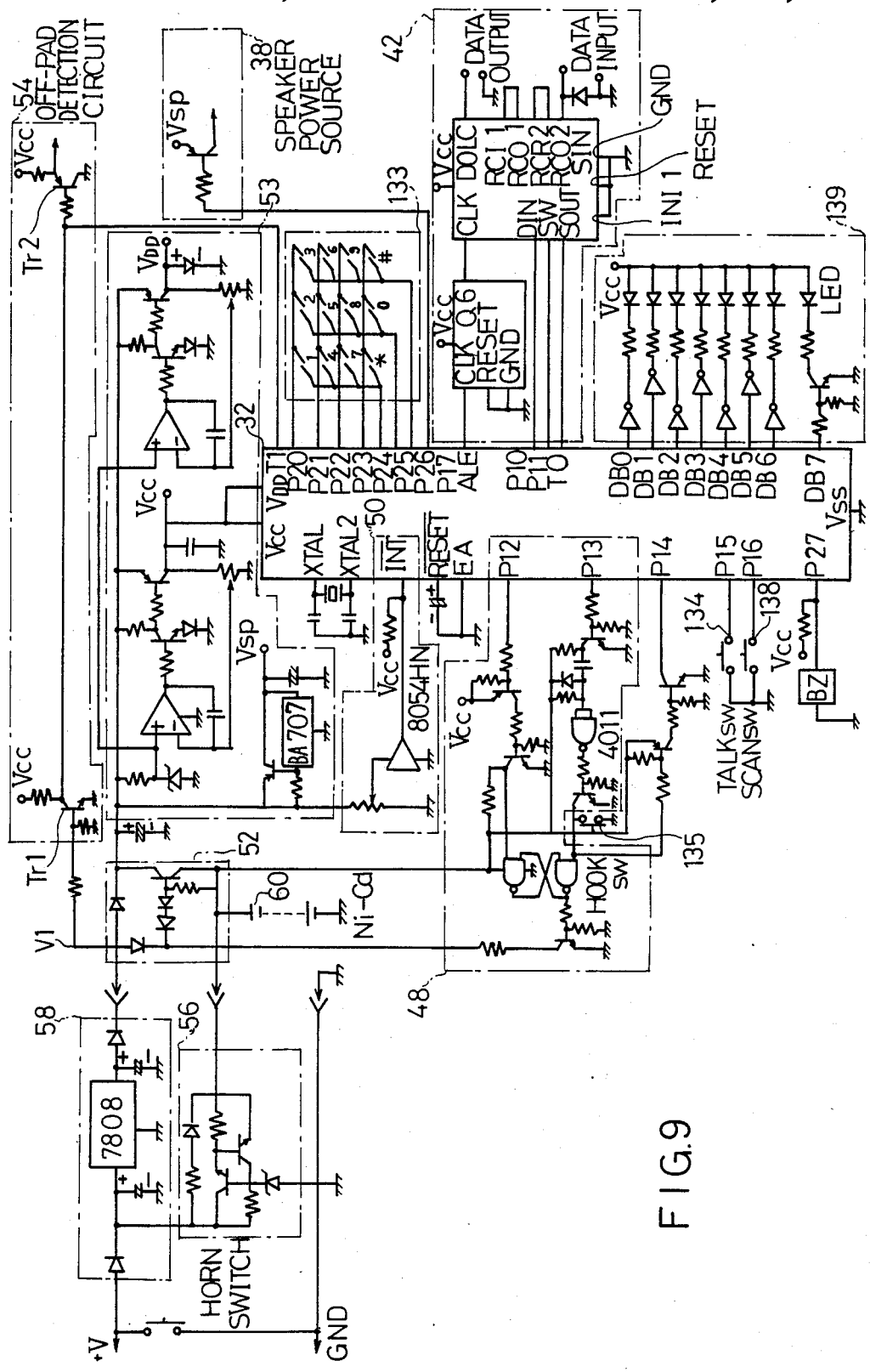
FIGS. 9, 10 and 11 are detailed circuit diagrams of the equipment.

FIG. 9 is a schematic diagram showing part of the circuit arrangement of the handset shown in FIG. 7. In both figures, corresponding circuit blocks are referred to by the common symbols. The hook switch 135 generates the hook on/off signals for the closed-speech mode operation, and also operates to supply power from the rechargeable cell 60 to the handset circuitries in response to the off-hook action of the handset by the user from the pad. In response to the control signal from P13 caused by the operation of the talk switch 134 at the termination of the speech, the CPU 32 can shut off the power supply from the rechargeable cell 60. The indicator 139 is an 8-segment 1-digit numeric indicator.

Figure 10:
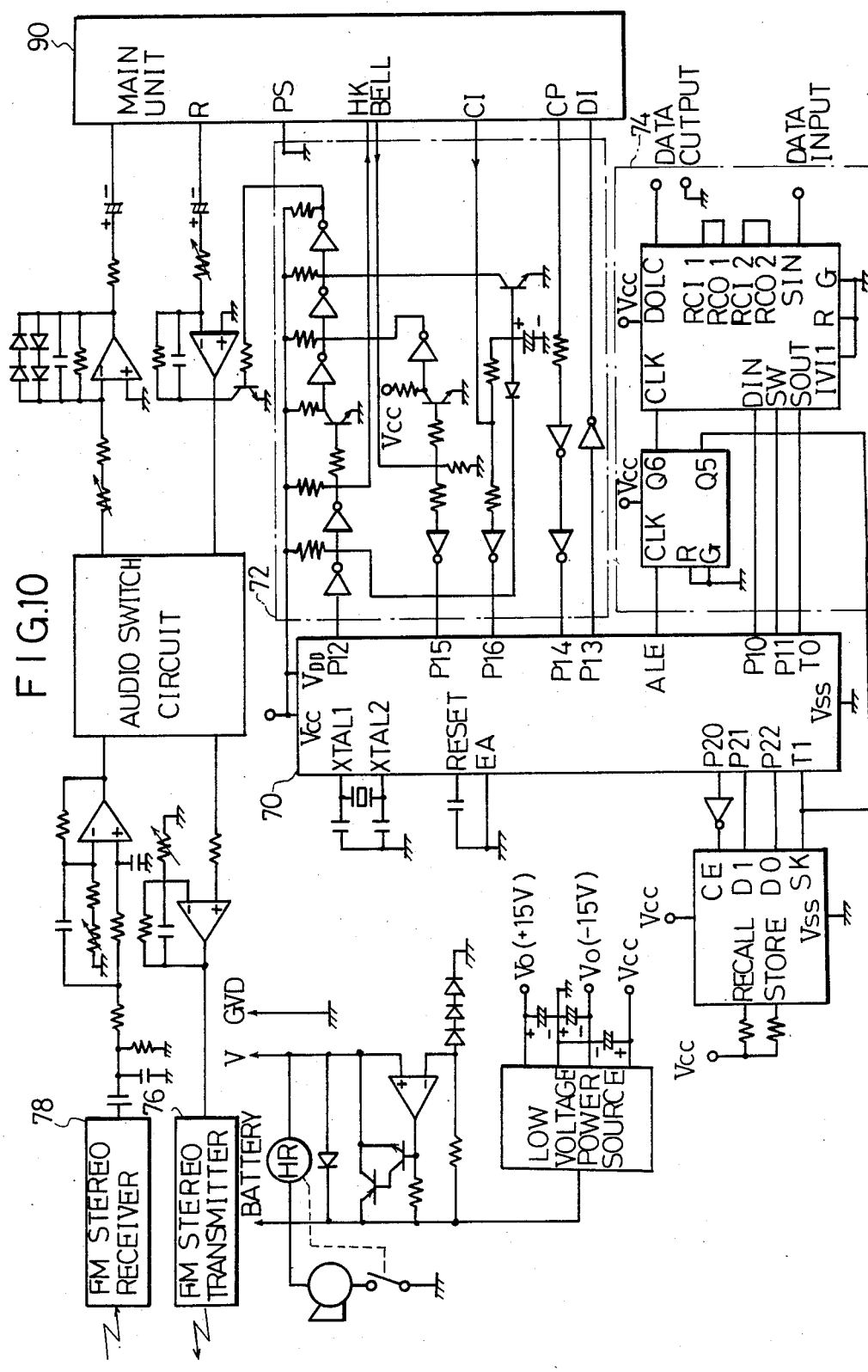
Figure 11:
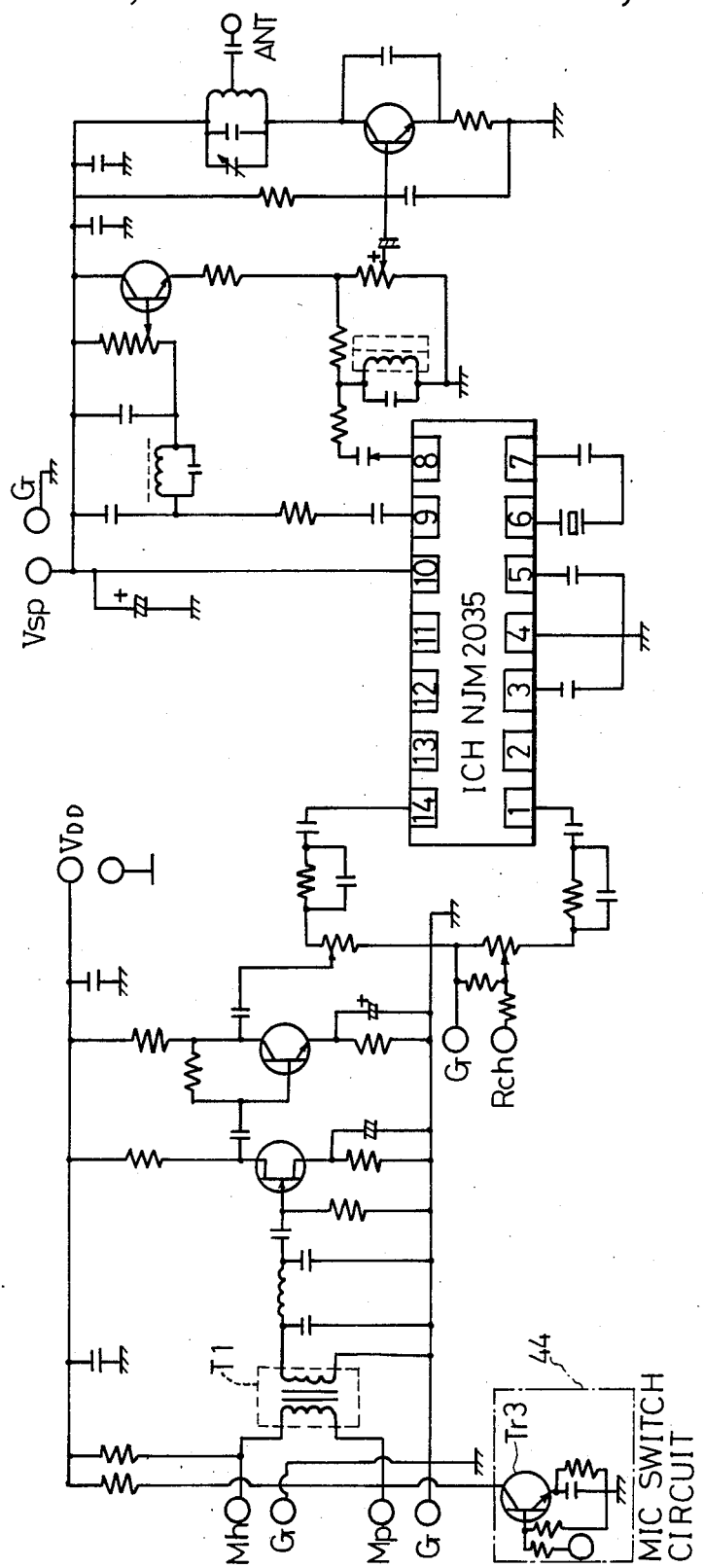
Figure 12A:
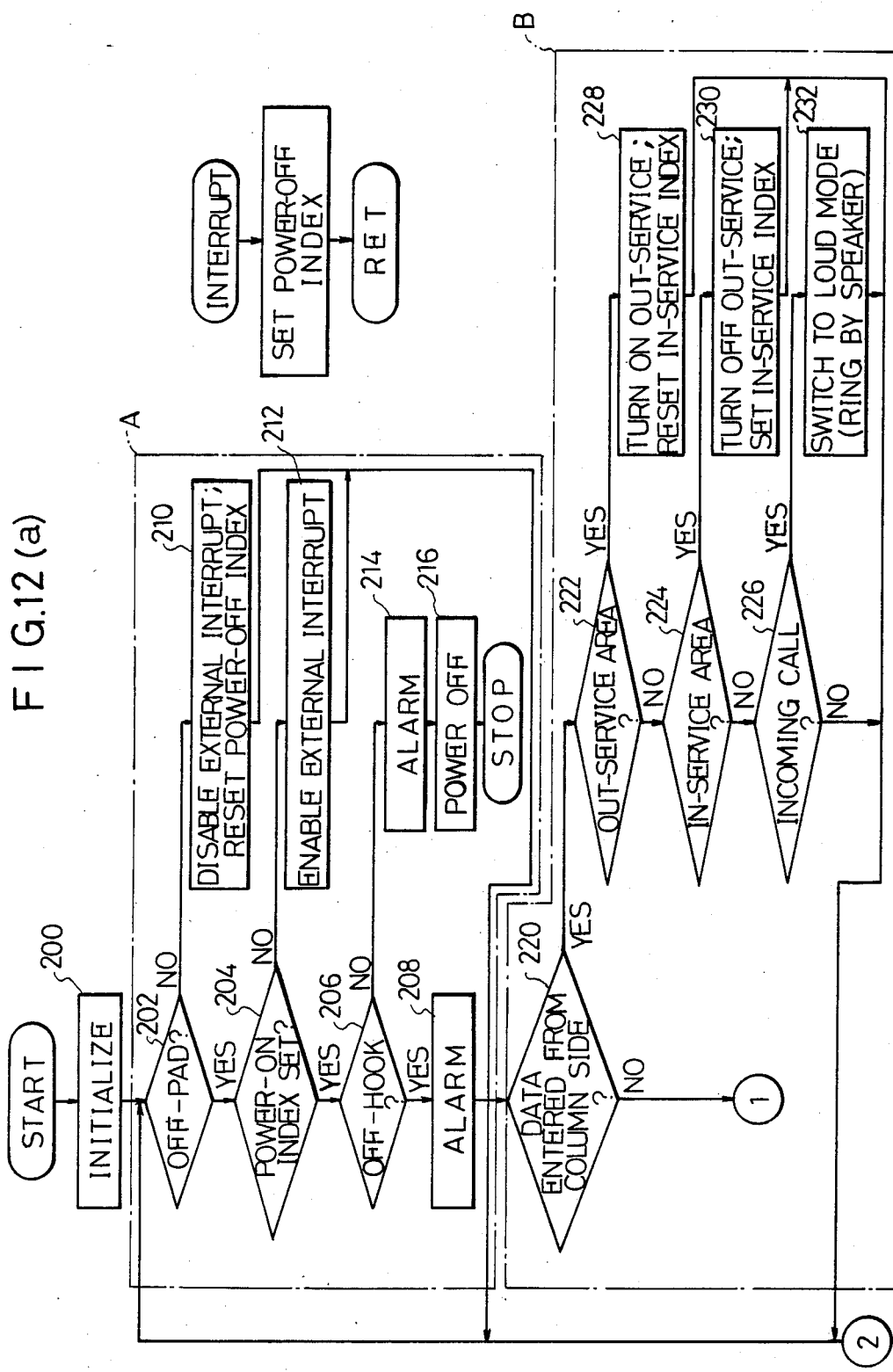
FIGS. 12(a), 12(b), 12(c), 12(d), 12(e) and 13 are flowcharts showing the processings of the computers used in the equipment.
Figure 12B:
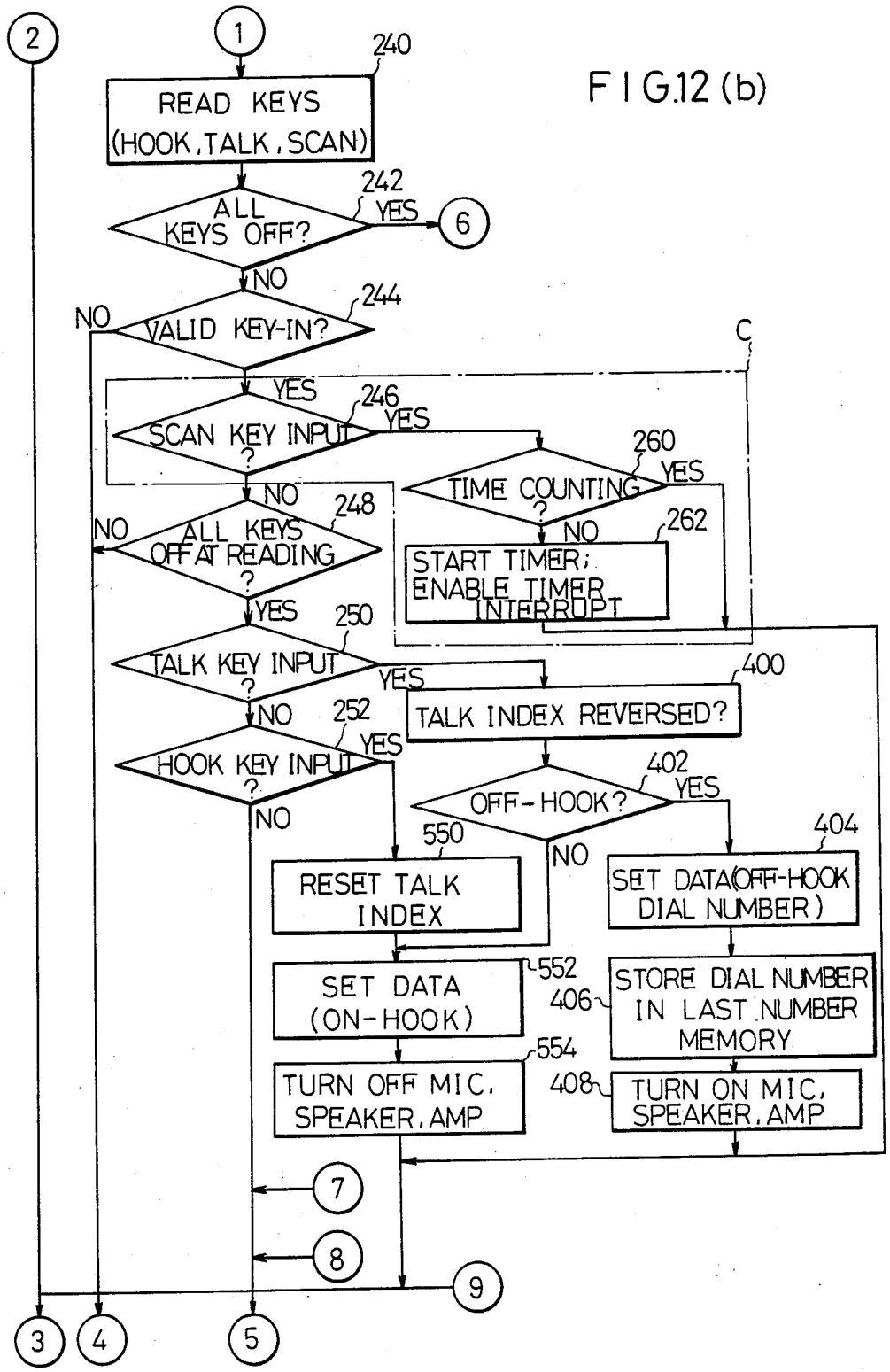
Figure 12C:
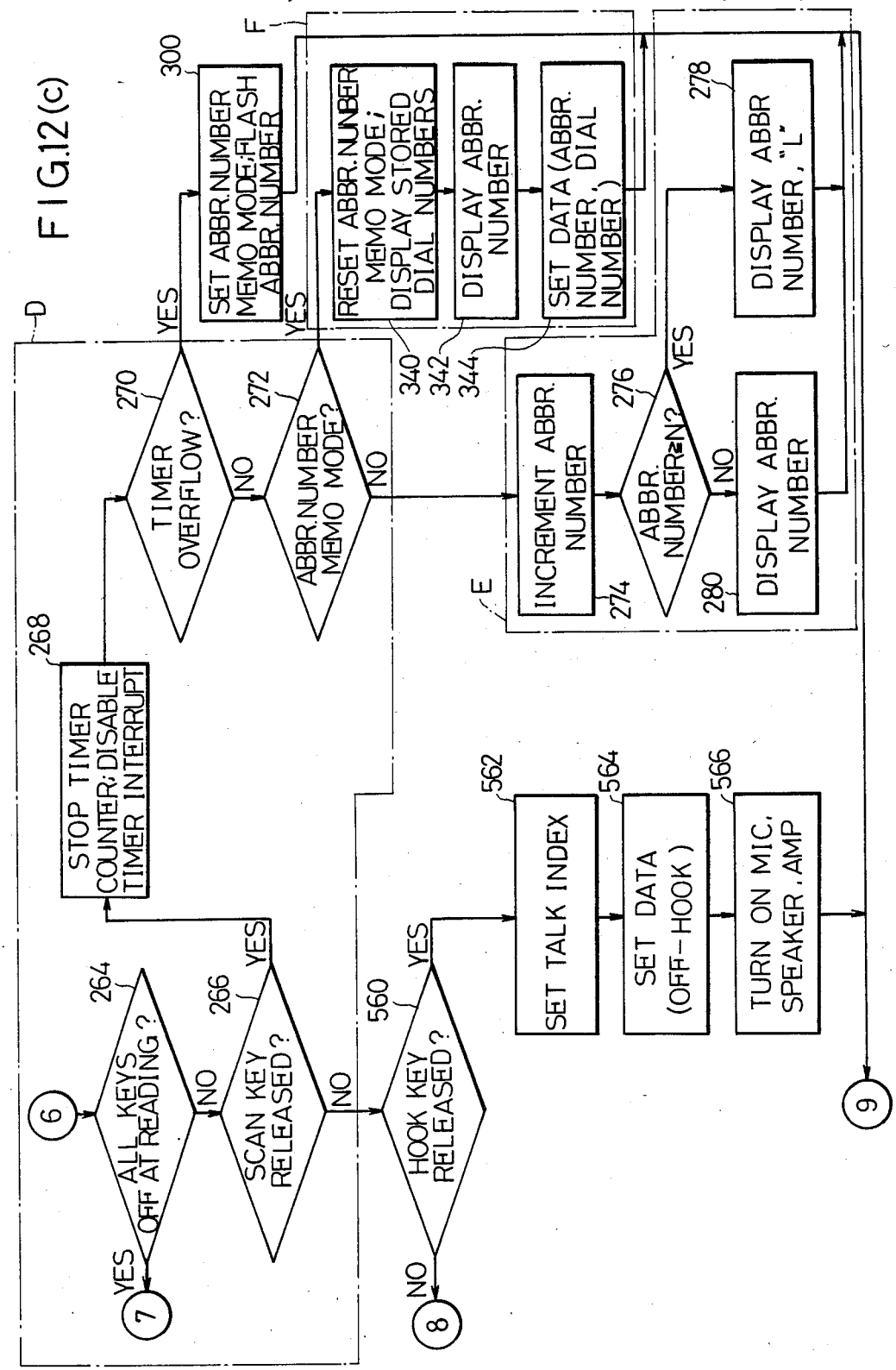
Figure 12D:
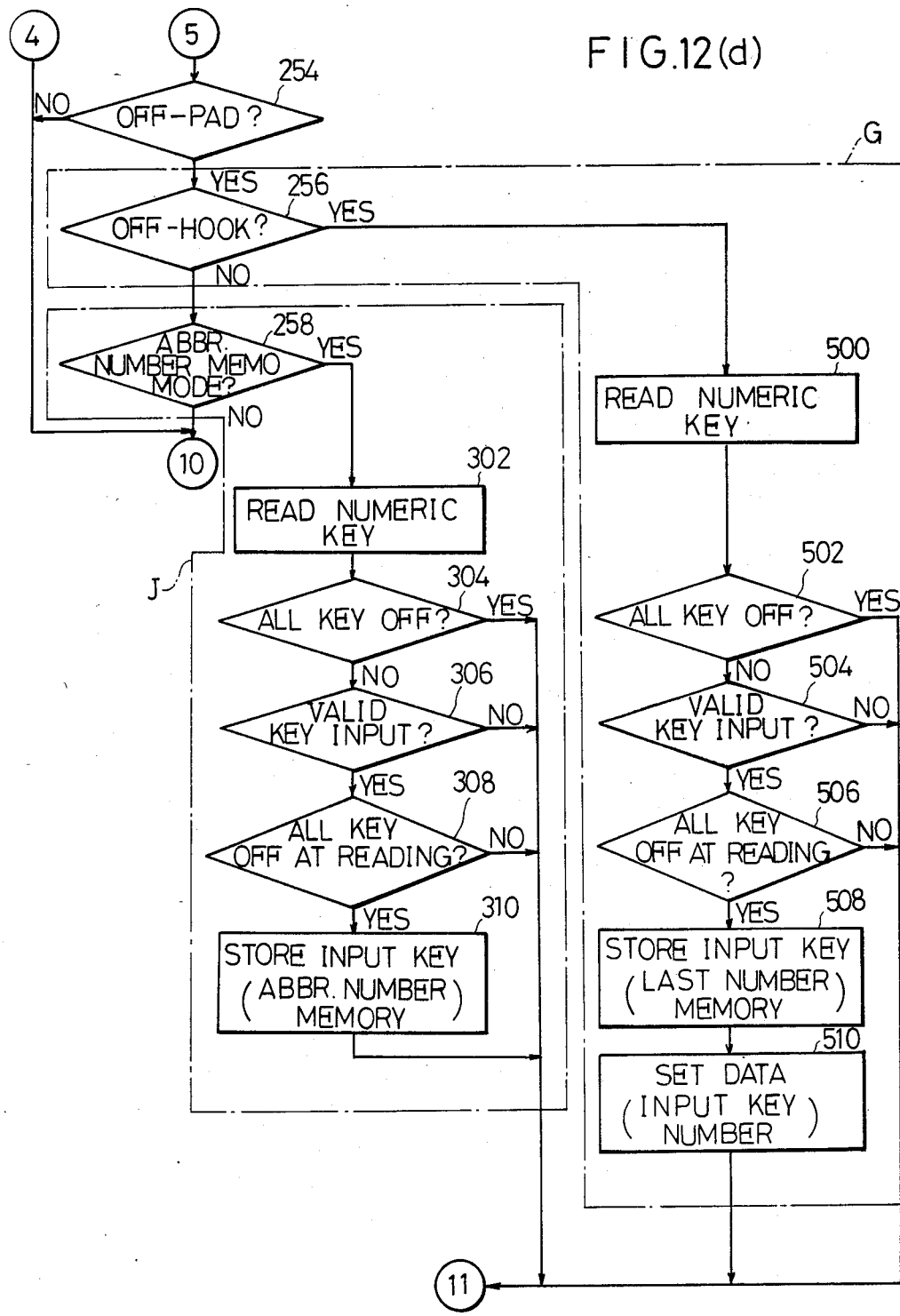
Figure 12E:
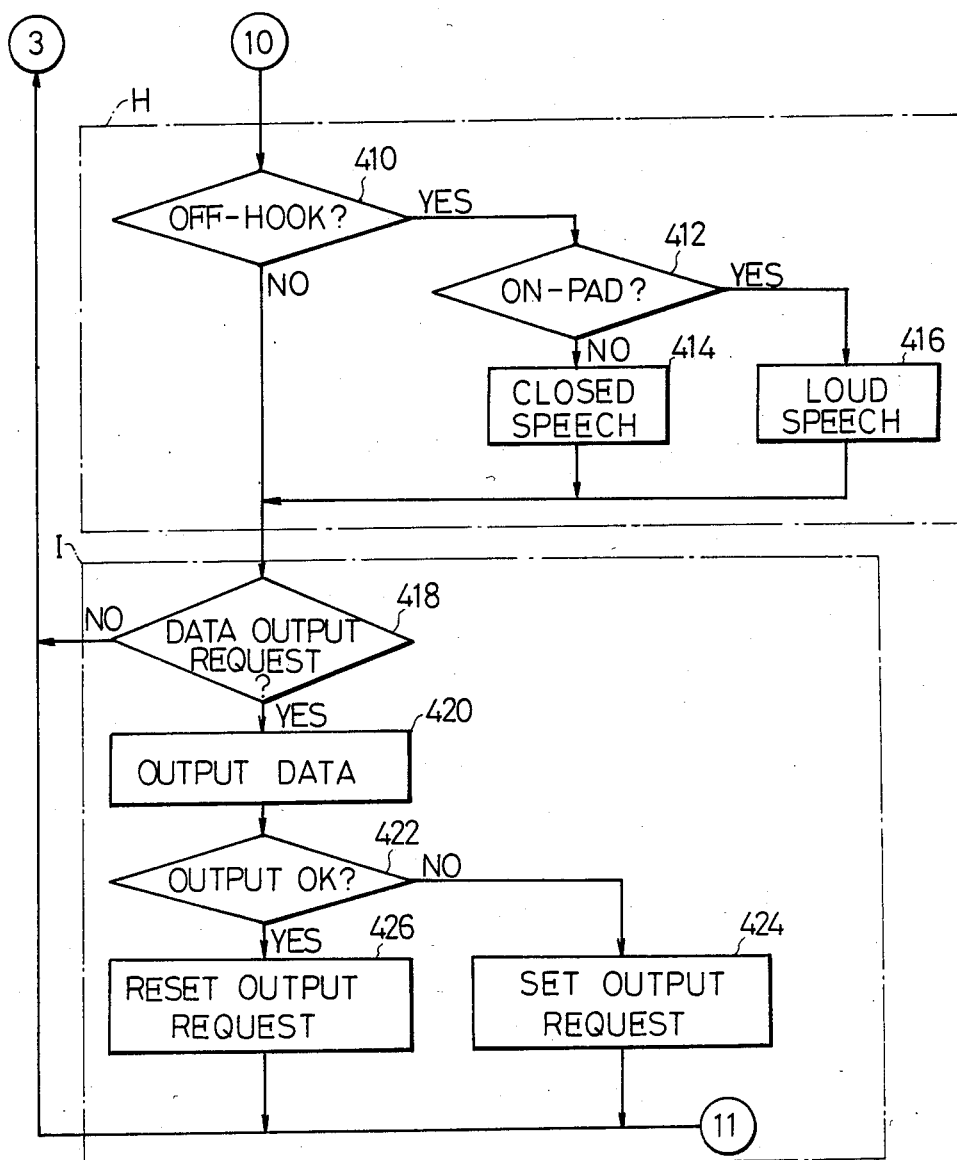

FIG. 10 is a schematic diagram showing in detail the circuit arrangement of the relay unit shown in FIG. 8. In both figures, corresponding circuit blocks are referred to by the common symbols. FIG. 11 is a schematic diagram showing in detail the circuit arrangement of the microphone switch circuit 44, amplifier 46 and FM stereo transmitter 36 within the mode selector.

The off-pad detection circuit in FIG. 9 detects as to whether the handset is held in the pad or taken out of the pad, and is made up of transistors Tr1 and Tr2. With the handset held in the pad, the terminal 65 receives the voltage V1 from the voltage regulator 58 and consequently the off-pad detection circuit 54 provides the output voltage V2 at a low level. Conversely, when the handset is taken out of the pad, the terminal 65 opens, causing the transistors Tr1 and Tr2 to turn off, resulting in the transition of the output voltage V2 to a high level.

The mode selector (microphone switch circuit) 44 is made up of a transistor Tr3. The transistor Tr3 operates in response to the signal V2, being non-conductive when the handset is held in the pad, or being conductive when it is taken out of the pad.

A differential detector for evaluating the difference between the outputs of the microphones 131 and 140 is arranged by a transformer T1, which has the primary winding connected between the output terminals of the first microphone 131 and second microphone 140. When the handset is held in the pad, causing the transistor Tr3 to be cut off, the outputs of the first and second microphones 131, 140 are applied to the primary winding of the transformer T1, resulting in the production of a differential output on the secondary winding. The output signal is amplified by the microphone amplifier 46. In another case when the handset is taken out of the pad, causing the transistor Tr3 to be conductive, the second microphone 140 has its input terminal Mp grounded in a sense of a.c. circuit. Accordingly, the transformer T1 receives only the output of the first microphone 131. In this way, the loud-speech mode and closed-speech mode are switched depending on the presence or absence of the handset in the pad.

FIG. 12(a), 12(b), 12(c), 12(d) and 12(e) are flowcharts showing the processings of the CPU 32 accommodated within the handset. Part A including steps 202 through 216 is a processing routine dealing with the operation against power voltage variation. As mentioned previously, the handset is supplied with power from the vehicle battery when it is held in the pad, or from its own rechargeable cell when it is taken out of the pad. If the voltage of the rechargeable cell falls below a certain level, an external interrupt is generated so that the CPU halts the processing.

Part B including steps 220 through 230 is a processing routine specific to the mobile communication, dealing with the operation of the case when the vehicle has gone out of the service area of the base station.

A routine including steps 240 through 258 reads the states of the operating keys. A routine of part C including steps 246, 260 and 262 counts time in which the station call switch (SCAN switch) 138 is depressed. Part D including steps 264 through 272 is to evaluate the time length of depressing the switch 138. Part E including steps 274 through 280 selects an abbreviated telephone number through the incrementing operation, and reads out the selected number on the indicator. Part F including steps 340 through 344 is to display stored telephone numbers sequentially during the scanning operation. The routine F is initiated when the station call switch is operated for at least the specified duration and then operated again for a duration less than the specified time length.

Part J including steps 258 and 302-310 is a processing routine for fetching a telephone number from the keyboard in correspondence to the selected abbreviated number and storing the telephone number. This routine is initiated when the station call switch is operated for at least the specified duration and then the keyboard is operated.

Though these operating steps, the inventive telephone equipment allows the calling of a called party by scanning the abbreviated telephone numbers and also displaying and memorizing corresponding telephone numbers.

Part G including steps 500 through 510 is the transmission process for the operation using the hook switch 135 and push button set 133. The last digit of the calling (last number call) number is memorized so as to allow a simple re-calling with the talk switch 134 when character "L" is displayed on the indicator 139. Part H including steps 410 through 416 selects the loudspeech mode or closed-speech mode depending on the presence or absence of the handset in the pad. Part I including steps 418 through 426 is a processing routine for sending the signal to the computer within the relay unit in corespondence to the selected telephone number.

Figure 13:
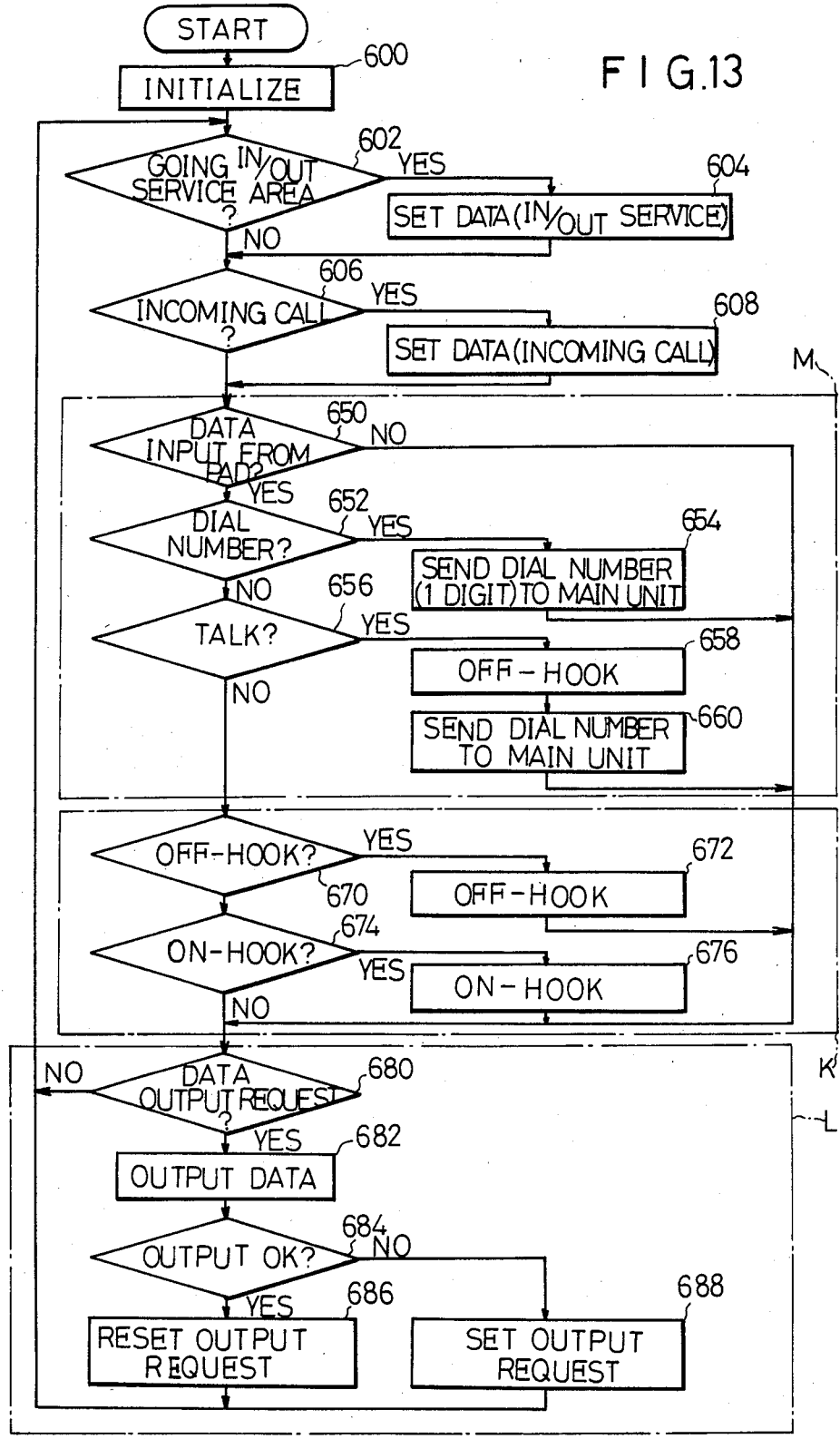

FIG. 13 is a flowchart showing the processing of the CPU 70 within the relay unit. Steps 602 and 604 are for the process when the vehicle has gone out of the service area. Steps 606 and 608 deal with incoming call. Part M including steps 650 through 660 is routine for sending a telephone number from the handset to the main unit. When the talk switch is operated as sensed in step 656, step 658 produces the off-hook signal and step 660 outputs the telephone number. Part K including steps 670 through 676 is a routine for sending the on-hook or off-hook signal to the main unit depending on the state of the talk switch. Part L including steps 680 through 688 is a routine for outputting data to the handset in response to the reception of an incoming call by the mobile equipment main unit.

The present invention is embodied by the foregoing circuit arrangement and its operation.

What is claimed is:

1. A land mobile telephone system comprising: a handset incorporating a microphone, a speaker, an operating unit allowing the selection of a called party for establishing a call, a transceiver implementing transmission and reception of an audio signal and control signal by radio with a relay unit, a controller which receives a signal from said operating unit and issues a control signal depending on the operating state of said operating unit to said relay unit via said transceiver, and a power storage supplying electric power to the above-mentioned devices; and said relay unit connected to a land mobile telephone main unit and adapted to transact the audio signal and control signal with said transceiver and perform radio telephone transmission and reception with a base station, said handset being installed detachably in a pad of a steering wheel of an automobile and having a power terminal for feeding electric power from an automobile-equipped battery to said handset devices when said handset is seated in the steering wheel pad, said controller having a speech mode selector which selects a loud-speech mode when said handset is seated in the steering wheel pad or selects a closed-speech mode when said handset is taken out of the steering wheel pad.

2. A land mobile telephone system according to claim 1, wherein said operating unit includes an indicator for displaying an abbreviated telephone number of a called party, and an operating switch for scanning abbreviated telephone numbers on said indicator, said controller being adapted to transmit a telephone number signal corresponding to a selected abbreviated telephone number to said relay unit through said transceiver.

3. A land mobile telephone system according to claim 1, wherein said operating unit includes an indicator for displaying an abbreviated telephone number of a called party, and an operating switch for scanning abbreviated telephone numbers on said indicator, and said controller includes a memory controller for storing a telephone number corresponding to a selected abbreviated telephone number, and a display controller for displaying the stored telephone number.

4. A land mobile telephone system according to claim 1, wherein said power supply used when said handset is seated in said steering wheel pad is derived from power lines connected to a horn switch.

5. A land mobile telephone system according to claim 1, wherein said mode selector operates in the loud-speech mode to switch the speech mode to detect an audio signal in response to a difference of signals detected by said microprocessor equipped in said handset and a second microphone equipped coaxially with said first-mentioned in said steering wheel pad.

* * * * *